United States Patent [19]
Hyland et al.

[11] 3,712,680
[45] Jan. 23, 1973

[54] VEHICLE WHEEL WITH FAIL SAFE FEATURES

[75] Inventors: William P. Hyland, Cuyahoga Falls, Roy W. Baird, James A. Culbertson, both of Akron, all of Ohio

[73] Assignee: The Goodyear Tire & Rubber Company, Akron, Ohio

[22] Filed: Nov. 27, 1970

[21] Appl. No.: 93,270

[52] U.S. Cl. .................................301/63 DS, 301/95
[51] Int. Cl. ................................................B60b 3/08
[58] Field of Search......301/62, 63 R, 63 DS, 63 DD, 301/65, 95, 98, 5; 152/375

[56] References Cited

UNITED STATES PATENTS

| | | | |
|---|---|---|---|
| 2,818,303 | 12/1957 | Main et al. | 301/63 R |
| 2,990,216 | 6/1961 | Albright et al. | 301/63 DS |

FOREIGN PATENTS OR APPLICATIONS

| | | | |
|---|---|---|---|
| 800,387 | 8/1958 | Great Britain | 301/63 R |

Primary Examiner—Robert J. Spar
Attorney—F. W. Brunner, P. E. Milliken and Oldham & Oldham

[57] ABSTRACT

A localized area of reduced thickness is provided on a vehicle wheel. One side of the localized area is exposed to tire inflation pressure while the other side of the area is exposed to atmospheric pressure. The area is located at the region in which the likelihood of crack propagation through the section due to fatigue failure of the wheel is at a maximum and circumferential propagation of a failure is at a minimum. The thickness of the reduced area is determined from the wheel characteristic so that a crack failure will occur at the localized area, resulting in a gradual release of pressure from the tire, before circumferential failure occurs.

4 Claims, 2 Drawing Figures

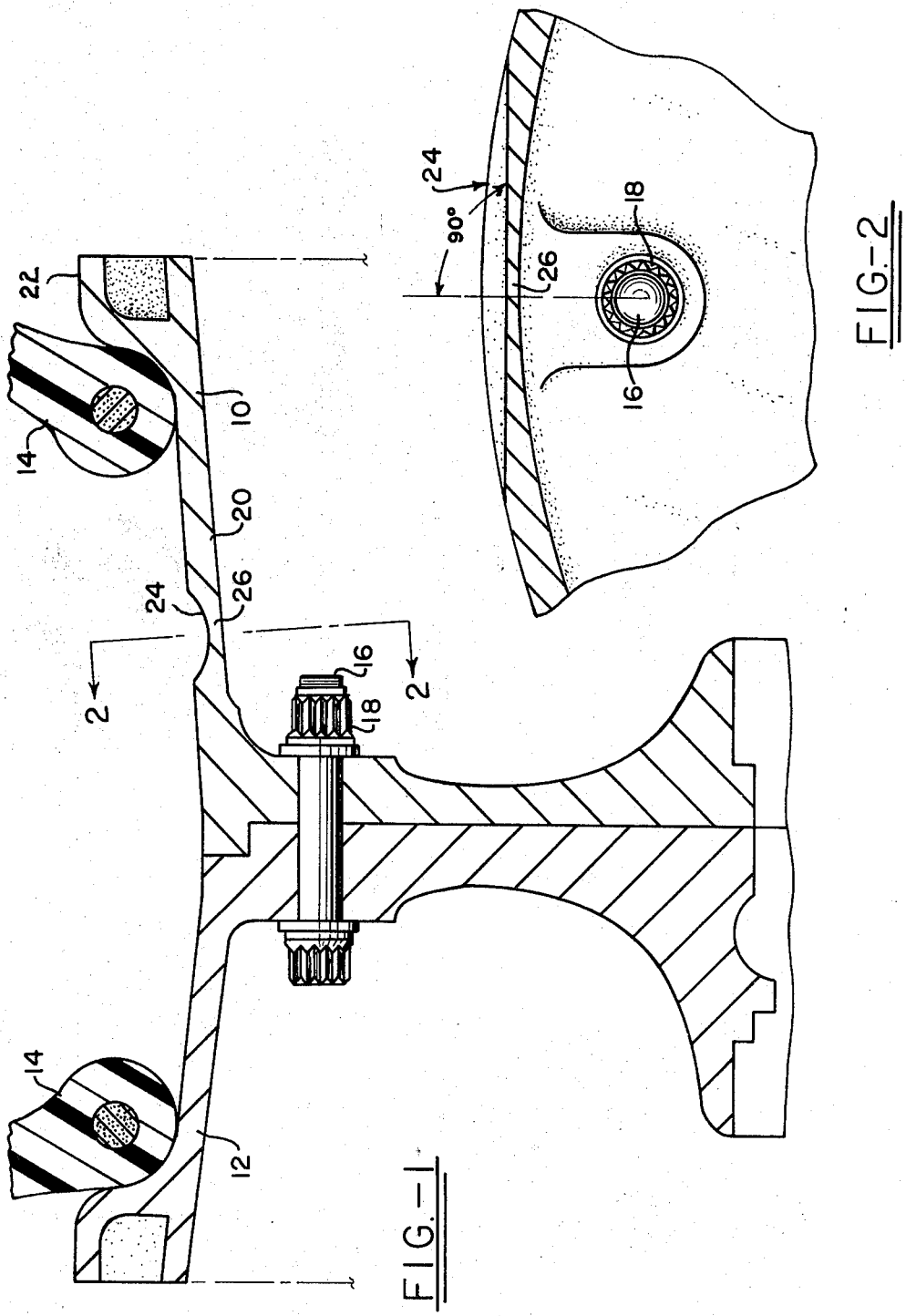

VEHICLE WHEEL WITH FAIL SAFE FEATURES

Fatigue failure of wheels occurs as a result of repeated stress cycles which causes the localized crystalization of the materials and the formation of cracks. The problem in particularly acute in wheels such as those in aircraft which are subjected to repeated high loads. The fatigue cracks may propagate either circumferentially around the wheel or radially through the section of the wheel structure. The circumferential cracks frequently do not penetrate through the wheel section. As a result, full tire pressure is maintained until the circumferential crack has developed sufficiently to weaken the wheel structure to a point at which the entire tube-well or flange portion breaks away from the remainder of the wheel. Such failures are potentially dangerous since the breaking away of the flange or tube well occurs with explosive force.

It is the primary object of the present invention to provide a wheel structure in which the presence of fatigue failure is detected before a circumferential fatigue crack can develop to a sufficient extent to destroy a structural integrity of the wheel.

It is also an object of the present invention to provide a wheel structure in which the development of a fatigue crack will result in the gradual loss of tire pressure and which eliminates the danger of an explosive failure of the wheel structure.

A further object of the invention is the provision of a wheel structure having a fatigue crack indicating feature which does not require any inspection or measurement of the wheel structure to determine the development of a fatigue crack.

As will become apparent from the following description, the above an other objects of the invention are achieved by providing a localized area of reduced thickness in the wheel structure which area is located in a region where there is the greatest likelihood of fatigue crack propagation through the wheel section and the least likelihood of propagation circumferentially about the wheel. The area is also located so that one surface is exposed to the tire inflation pressure while the other side of the area is exposed to the atmospheric pressure so that the development of a fatigue crack through the area results in a gradual loss of inflation pressure through the crack.

For a more complete understanding of the invention and of the objects and advantages thereof reference should be had to the following specification and the accompanying drawings wherein there is shown a preferred embodiment of the invention.

In the drawing:

FIG. 1 is a fragmentary transverse sectional view through a wheel and tire assembly with the wheel being provided with the fatigue indicating region of the present invention; and FIG. 2 is a fragmentary sectional view taken along the line 2—2 of FIG. 1.

The wheel illustrated in the drawings consists of an outboard wheel half 10 and an inboard wheel half 12 which are fastened together by bolts 16 and nuts 18 and which mount a pneumatic tire 14. Each wheel half 10 and 12 has a generally cylindrical tire well portion 20 and a flange 22 which serves to retain the bead of the tire 14. Analysis of the stress concentration on this wheel structure reveals that the tire well portion 20 is the region of the wheel assembly in which the stress concentrations which can cause propagation of a crack through the wheel section are at a maximum.

In accordance with the principles of the invention, a region of the tire well section 20 is reduced in thickness to achieve a sufficiently high stress concentration to assure that a fatigue crack will develop through the reduced thickness section before a circumferentially propagated crack can develop to the extent necessary to destroy the structural integrity of the wheel. This reduced thickness region may be in the form of a circumferential groove 24 extending across the tire well section 20. As shown in the drawings, the groove 24 may be of uniform radius in cross section with its base line lying on a chord through the tire well section of the wheel. The resultant reduced thickness area 26 is thus in a region of high stress concentration in which fatigue cracks have the greatest likelihood of being propagated. When a crack develops through this area 26 of reduced thickness, there will be a gradual escape of air from the space between the tire 14 and the wheel halves 10 and 12. Since the region of reduced thickness 26 is localized, the wheel retains its structural integrity even after the development of a fatigue crack through the area 26. As a result, the explosive disintegration of the wheel is eliminated.

The groove 24 preferably extends circumferentially along an arc of between 5° and 60°, depending upon the desired reduction in thickness of the tube well portion 20 of the wheel. However, it should be understood that other configurations may be used and may be preferable with different conditions of wheel diameter, physical dimensions and necessary wheel life. In each instance, however, the groove or area of reduced thickness is located at the point of greatest stress concentration to propagate cracks through the wheel section and with one side of the reduced thickness area exposed to the entrapped pneumatic pressure with the other side of the area being exposed to the atmospheric pressure so that the development of a crack through the reduced thickness section will result in the gradual and safe loss of tire pressure.

It should be noted that the tire bead 14 does not extend over the area 26 as shown in FIG. 1 so that loss of air will occur upon failure of area 26.

It should also be clearly understood that the principles of the invention are applicable to any type of wheel and to wheels made of materials other than aluminum, for example, to plastic, magnesium, or steel wheels.

While in accordance with the patent statutes, only the best known embodiment of the invention has been described in detail, the invention is not so limited and reference should be had to the appended claims in determining the true scope thereof.

What is claimed is:

1. A wheel assembly for a pneumatic tire having a tire well portion and tire retaining flanges which comprises:

a groove of reduced thickness extending substantially circumferentially around at least a portion of the tire well portion of the wheel assembly, one surface of the groove being exposed to pressurized air contained between the wheel assembly and tire, the other surface of the groove being exposed to the atmosphere, the groove being located in the region of the wheel assembly in which stress concentrations during loaded wheel assembly operation are high and being of sufficiently reduced thickness with respect to the remainder of the tire well portion so that fatigue failure caused by normal load stresses will occur in such groove before any other portion of the wheel assembly.

2. A wheel assembly according to claim 1 wherein the groove extends along an arc of between 5° and 60°.

3. A wheel assembly according to claim 1 wherein the groove is of uniform radius in cross-section and the base of the groove lies on a chord through the wheel portion.

4. A wheel assembly according to claim 1 wherein the groove is located on the radially outer surface of the tire well portion.

* * * * *

UNITED STATES PATENT OFFICE
CERTIFICATE OF CORRECTION

Patent No. 3,712,680      Dated January 23, 1973

Inventor(s) HYLAND, WILLIAM P., ET. AL.

It is certified that error appears in the above-identified patent and that said Letters Patent are hereby corrected as shown below:

Column 2, line 10, before "This", insert

-- Normal strain gauge analysis might be used to measure stress concentration during dynamic loading to determine the area of the wheel with high stress characteristics and that the stress characteristics of the area of reduced section which is placed somewhere in the area of high stress characteristics is indeed the highest so that failure caused by stress under dynamic loading will occur in the reduced section first. Strain gauge analysis is a usual practice in wheel and brake engineering and such procedure is within the capabilities of one skilled in the art. -- .

Signed and sealed this 25th day of December 1973.

(SEAL)
Attest:

EDWARD M. FLETCHER, JR.
Attesting Officer

RENE D. TEGTMEYER
Acting Commissioner of Patents